United States Patent [19]
Fischer et al.

[11] 4,092,252
[45] May 30, 1978

[54] CONTROLLING CORROSION IN GAS-CONTAINING AQUEOUS DRILLING FLUID

[75] Inventors: Paul W. Fischer, Whittier; David S. Pye, Brea, both of Calif.

[73] Assignee: Union Oil Company of California, Brea, Calif.

[21] Appl. No.: 683,092

[22] Filed: May 4, 1976

[51] Int. Cl.² ............................ C09K 7/02; C09K 7/08
[52] U.S. Cl. .................................. 252/8.5 A; 175/69; 175/71; 252/8.5 C
[58] Field of Search ............ 252/8.5 A, 8.5 C, 8.55 B, 252/8.55 E, 390; 175/69, 71

[56] References Cited

U.S. PATENT DOCUMENTS

| | | | |
|---|---|---|---|
| 2,515,207 | 7/1950 | Fisher | 252/8.5 |
| 2,650,197 | 8/1953 | Rahn | 252/8.5 |
| 2,889,276 | 6/1959 | Barrett et al. | 252/8.55 |
| 2,923,681 | 2/1960 | Hein et al. | 252/8.5 |
| 3,307,625 | 3/1967 | Johnson et al. | 252/8.5 X |
| 3,313,362 | 4/1967 | Schneider | 252/8.5 X |
| 3,486,560 | 12/1969 | Hutchison et al. | 175/69 X |
| 3,749,554 | 9/1973 | Fischer et al. | 252/8.55 X |
| 4,013,568 | 3/1977 | Fischer et al. | 252/8.5 |

*Primary Examiner*—Herbert B. Guynn
*Attorney, Agent, or Firm*—Richard C. Hartman; Dean Sandford; Gerald L. Floyd

[57] ABSTRACT

A composition and method for drilling wells through subterranean strata containing high temperature aqueous fluids using a gas-containing aqueous drilling fluid containing an alkaline material to raise the pH of the drilling fluid to provide corrosion protection in the liquid phase and a volatile water-soluble nitrogen-containing compound to provide corrosion protection in the gaseous phase.

16 Claims, No Drawings

CONTROLLING CORROSION IN GAS-CONTAINING AQUEOUS DRILLING FLUID

BACKGROUND OF THE INVENTION

(1) Field of the Invention

This invention relates to the drilling of wells into subterranean strata containing high temperature fluids such as aqueous geothermal fluids or brines. More particularly, this invention relates to an improved aqueous gas-containing drilling fluid composition and method of use thereof which composition provides improved protection against corrosion of the well conduit and other metal parts of the well apparatus which are exposed to the drilling fluid.

(2) Description of the Prior Art

Drilling wells into subterranean strata containing a high temperature fluid presents many problems concerning the choice of a drilling fluid. Conventional aqueous base drilling fluid containing water, clay and various additives is generally used in drilling the first two to four thousand feet of hole through the usually somewhat incompetent strata above the strata containing the high temperature fluid. Casing is cemented in place over this portion of the hole and drilling is continued using any one of a number of drilling fluids. Problems arise at lower depths when the drill bit penetrates those strata containing a high temperature fluid, which formations often lie several thousand feet below the surface. Such formations are sometimes highly porous and permeable. If conventional drilling fluid is used, the weight of the high gravity column of drilling fluid in the well is so great that a considerable amount of the fluid invades the formation. This necessitates use of a large additional volume of fluid and results in partial plugging of the formation by the clay and other solids in the fluid. When the well is subsequently completed, this plugging decreases the amount of fluid which can be produced via or injected into the well. If a relatively light-weight drilling fluid, such as air or another gas, is used, a high rate of circulation of the drilling fluid through the system is required to circulate cuttings out of the hole. This high rate of circulation of the drilling fluid together with the fluids produced from the formation, result in corrosion and erosion problems. The high velocity gaseous fluids erode the unconsolidated portions of the formation to such an extent that hole stability cannot be achieved. In many cases, even the drill pipe is eroded.

One solution to these problems has been to drill formations containing a high temperature fluid with aqueous gas-containing drilling fluid. Use of this light-weight, gas-containing drilling fluid comprising a mixture of water, a gas such as air, a fluid loss control additive, an additive to improve wall-building and cuttings-carrying properties, and optionally a foaming agent, results in increased penetration rates, reduced bit wear and reduced formation damage due to erosion by the drilling fluid as compared with air. However, the metal well equipment exposed to such circulating gas-containing drilling fluid in a high temperature environment is subject to severe corrosion caused by various components in the drilling fluid as well as various fluids entering the well from the surrounding strata.

U.S. Pat. No. 3,653,452 to Fischer et al. issued Apr. 4, 1972 describes a method of gas drilling a high temperature formation using an ammonium or an amine salt of a tertiary amine having a molecular weight above 260 as an additive to the gas stream as an erosion and corrosion inhibitor. At elevated temperatures of 250° F. and above, the additive releases ammonia or a vaporous amine which forms a resinous residue on the well equipment.

Pending U.S. patent application Ser. No. 639,652 by Fischer et al. filed Dec. 11, 1975, now U.S. Pat. No. 4,013,568, describes an aerated drilling fluid for drilling geothermal strata which drilling fluid contains the same ammonium or amine salts. However, in drilling many strata containing a high temperature fluid with this particular aerated drilling fluid, considerable corrosion of the well equipment still occurs.

U.S. Pat. No. 3,307,625 to Johnson et al. issued Mar. 7, 1967 describes an aqueous base drilling fluid containing an inhibitor to control corrosion due to hydrogen sulfide encountered during drilling. The drilling fluid contains an amount of caustic which is sufficient to maintain the pH of the drilling fluid above 7, plus enough alkali metal sulfide to raise the pH above 9.

U.S. Pat. No. 2,496,594 to Moyer et al. issued Feb. 7, 1950 discloses a method of inhibiting corrosion of oil field equipment exposed to crude oil — brine mixtures by adding thereto a mixture of formaldehyde and ammonia or an amine.

U.S. Pat. No. 2,889,276 to Barrett et al. issued June 2, 1954 describes volatile aliphatic amines as vapor phase corrosion inhibitors for oil well casing and tubing exposed to liquids and vapors containing hydrogen sulfide and water.

While the corrosion inhibitor-containing fluids described in the foregoing patent application and patents have certain utility, need remains for an inhibitor to provide improved corrosion control to the entire system of oil field equipment exposed to gas-containing drilling fluid during the drilling of strata containing high temperature aqueous fluids.

Accordingly, a principal object of this invention is to provide a gas-containing drilling fluid composition and method for drilling strata containing high temperature fluids.

A further object of the invention is to provide such a composition and method wherein the metal well equipment exposed to the composition during drilling is protected against corrosion.

A still further object of the invention is to provide such a composition and method wherein the protection against corrosion is provided to the metal well equipment exposed to such a composition in either the liquid or vapor phase.

Another object of the invention is to provide such a composition which contains both a vapor phase corrosion inhibitor and a liquid phase corrosion inhibitor.

Still another object of the invention is to provide a corrosion inhibitor-containing drilling fluid composition and method for drilling strata containing a geothermal fluid.

An additional object of the invention is to provide a corrosion inhibitor-containing drilling fluid composition and method for drilling strata containing both hydrocarbons and a high temperature brine.

Other objects, advantages and features of the invention will become apparent from the following description and appended claims.

SUMMARY OF THE INVENTION

A composition and method of use thereof for drilling a well into a subterranean strata containing an aqueous fluid at a temperature of about 350° F. or above wherein there is circulated through the well during drilling a gas-containing aqueous drilling fluid which is a mixture of about 99.5 to about 90 volume percent of a gas and about 0.5 to about 10 volume percent of an aqueous dispersion containing about 327 to about 347 pounds per barrel water or brine, about 10 to about 2 pounds per barrel lignite, about 2.5 to about 0.5 pounds per barrel alkali metal or ammonium salt of a high molecular weight acrylic polymer, about 1.0 to about 0.05 pound per barrel of an organic agent that releases ammonia or a vaporous amine and forms a resinous residue at downhole temperature and pressure conditions, sufficient alkali metal hydroxide to raise the pH of the return stream of drilling fluid and produced fluids circulated out of the well during drilling operations to at least about 9, which generally requires about 0.1 to about 2 pounds per barrel alkali metal hydroxide, about 1.0 to about 0.05 pound per barrel of a water-soluble nitrogen-containing compound, which is volatile at a temperature of about the boiling point of water or below, selected from the class consisting of ammonia and primary aliphatic monoamines having from 1 to 5 carbon atoms, and, optionally, a foaming agent.

DETAILED DESCRIPTION OF THE INVENTION

It is known to drill wells into subterranean strata containing high temperature fluids with a gas-containing aqueous drilling fluid containing water or brine, a gas, a tertiary amine combination corrosion and erosion inhibitor which volatilizes at downhole temperature and pressure conditions to release ammonia or a vaporous amine, a fluid loss-control additive and an additive to improve wall-building and cuttings-carrying properties. However, considerable corrosion of the metal equipment exposed to the circulating drilling fluid still occurs. This highly corrosive environment is believed due in part to the high temperature of the system, the entry into the well of aqueous fluids from the formation during drilling, the corrosive nature of the gas component of the drilling fluid when a free-oxygen-containing gas such as air is employed as the gas, and the presence of a relatively large area of the metal surfaces exposed to hot gas, especially in the upper regions of the drill string where the temperature may be only about the boiling point of water at which temperature the previously used corrosion and erosion inhibitors will not volatilize. Two distinct areas of corrosion are usually affected, i.e., the metal surfaces exposed to liquid drilling fluid and produced fluids and those exposed to gaseous components of the drilling fluid and produced fluids. It has been discovered that corrosion in the liquid phase can be reduced by adding an alkaline material to the drilling fluid to raise the pH to about 9 or above, and that corrosion in the gaseous phase can be reduced by adding to the drilling fluid a water-soluble nitrogen-containing compound which is volatile at about the temperature of boiling water or below. The overall result is improved control of corrosion for all metal surfaces of the drill string and auxiliary equipment used in drilling the well.

When gases, such as a free-oxygen-containing gas such as air, or carbon dioxide, natural gas, nitrogen or combustion gases, are injected into an aqueous dispersion of clay circulated in a well being drilled, the resulting fluid is referred to as an "aerated drilling mud".

In drilling certain aqueous fluid-containing formations, such as geothermal formations, it is desirable to use a non-clay-containing drilling fluid. Clay tends to invade the relatively porous geothermal formations and causes plugging problems. Thus, there has been developed for drilling geothermal formations an "aerated drilling fluid" wherein a gas is injected into a stream of water or brine circulated in a well being drilled. No clay is employed. The gas may be partially soluble in the aqueous phase but is present largely in a dispersed or entrained form as the fluid passes down the well. As the fluid passes through the drill bit and circulates out of the well, it picks up cuttings and carries them to the surface. During the circulation, the aerated drilling fluid may tend to separate and travel through the well as alternate slugs of aqueous fluid and air. If the circulation rate is maintained relatively high, cuttings are still successfully transported out of the well in spite of the separation of the component parts of the aerated drilling fluid. If a foaming agent is included in the drilling fluid injected into the well, the resulting product is referred to as a "foam drilling fluid" and comprises a dispersion of gas in the aqueous phase. If sufficient foaming agent is utilized, the drilling fluid substantially maintains its integrity during circulation through the well. It is intended that the composition and method of this invention encompass any gas-containing drilling fluid, i.e., both aerated drilling fluid and foam drilling fluid.

The gas-containing drilling fluid of this invention comprises: (1) about 99.5 to about 90 volume percent gas and (2) about 0.5 to about 10 volume percent of an aqueous dispersion containing (a) about 327 to about 347 pounds per barrel water, (b) about 10 to about 2 pounds per barrel lignite fluid loss control additive, (c) about 2.5 to about 0.5 pounds per barrel alkali metal or ammonium salt of a high molecular weight acrylic polymer to improve wall-building and cuttings-carrying capacity, (d) about 1.0 to about 0.05 pound per barrel organic agent that releases ammonia or a vaporous amine at temperatures of about 250° F. and above that acts as a corrosion inhibitor and also forms a resinous residue at downhole temperature and pressure conditions that acts as an erosion inhibitor, (e) optionally, about 10 to about 0.25 pounds per barrel foaming agent, (f) sufficient alkali metal hydroxide to raise the pH of the return stream of drilling fluid and produced fluids circulated out of the well during drilling operations to at least about 9, generally about 0.1 to about 2 pounds per barrel of an alkali metal hydroxide, and (g) about 1.0 to about 0.05 pounds per barrel of a water-soluble nitrogen-containing compound that volatilizes at a temperature of about the boiling point of water or below. The volumes described above are determined at atmospheric conditions of temperature and pressure.

In a foam drilling fluid the aqueous solution to be foamed usually comprises about 90 to about 99.75 volume percent aqueous solution to be foamed and about 10 to about 0.25 volume percent foaming agent. The amount of foaming agent used is sufficient to maintain the foam formed sufficiently stable to be circulated through the drill string without appreciable separation. The foaming agent can be any of a wide variety of known anionic, cationic or nonionic surface active agents. Typical foaming agents are alkyl aryl sulfonates, fatty alcohol sulfates, sulfated and sulfonated amides and amines, sulfated and sulfonated esters and ethers, alkyl sulfonates, quaternary ammonium derivatives, the condensation products of a fatty material with ethylene or propylene oxide, the condensation products of phenolic compounds having lateral aliphatic groups with ethylene oxide and the like.

The foam is formed by combining the aqueous solution to be foamed and gas in a ratio so that the foam produced at downhole conditions of temperature and pressure comprises from about 0.5 to about 10 volume percent aqueous solution to be foamed and from about 99.5 to about 90 volume percent gas. The same ratio of aqueous solution to gas without the presence of a foaming agent can be used to form aerated drilling fluid.

For optimum drilling of formations containing high temperature aqueous fluids, it is necessary to further modify the above-described gas-containing drilling fluids. If air or carbon dioxide is the gas used in the drilling fluid, the resulting composition becomes more corrosive to the drill string and other metal well equipment with which it comes in contact than is liquid drilling fluid. If the gas used is methane, nitrogen or any other non-free-oxygen-containing gas, corrosion can still become a problem when drilling into geothermal fluids containing steam which is picked up and circulated along with the drilling fluid. This corrosion can be reduced by introducing into the circulating gas-containing drilling fluid stream a corrosion inhibitor, such as one that decomposes at downhole temperature and pressure conditions, generally 250° F. and above, to release ammonia or a vaporous amine which contacts and protects the metal surfaces of well equipment exposed to the gas-containing drilling fluid. The non-volatilized portion of the additive reacts or polymerizes to form a resinous residue that is deposited in part on the exposed metal surfaces and on the solid particles suspended in the drilling fluid, thereby reducing erosion and corrosion of these metal parts. Such erosion and corrosion inhibitors are described in U.S. Pat. No. 3,749,544 issued July 31, 1973 to Fischer, Maly and Pyle.

Generally the organic compounds useful as erosion and corrosion inhibitors are tertiary amines having molecular weights above about 260, and usually above about 300. A preferred class of compounds for use in the practice of the invention are the polyamine salts of an acidic triester of a trialkanol amine, which are generally represented by the following formula:

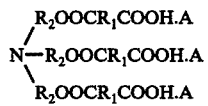

wherein $R_1$ is a bivalent hydrocarbyl radical containing from about 8 to about 44 carbon atoms, $R_2$ is an alkylene radical containing from about 1 to about 4 carbon atoms, and A is ammonia or a water-soluble amine containing from about 1 to about 15 carbon atoms, exemplary of which are the above-described amines. In a particularly preferred embodiment $R_2$ in the above formula is ethylene. While the polyamine compounds can be generally described by the above generalized formula, it is recognized that when polydentate water-soluble amines are used to form the salt, cross-linking between two or more of the polyamine molecules may occur. Thus, when these amines are employed, the polyamine compounds may have repeating acidic triester units.

Particularly preferred polyamine salts are the morpholine, ethylenediamine, N-butylaminoethanol, trimethylamine, dimethylamine, pyridine, triethanolamine, diethylenetriamine, and diethylaminoethanol salts of an acidic triester of triethanolamine, wherein the acidic triester is obtained by esterifying triethanolamine with a long-chain dibasic acid obtained by dimerizing linoleic or isolinoleic acid.

The organic agent can be injected directly into the gas-containing drilling fluid stream, or alternatively, the agent can be mixed with a carrier liquid and this admixture injected into the drilling fluid stream. Suitable carrier liquids are water; monohydroxy aliphatic alcohols having from 1 to 10 carbon atoms; aliphatic amines having from 1 to 10 carbon atoms; aliphatic carboxylic acids having from 1 to 10 carbon atoms; aliphatic aldehydes having from 1 to 10 carbon atoms; ketones having from 1 to 10 carbon atoms and mixtures thereof, especially aqueous mixtures.

In general, the organic agent is admixed with the carrier liquid in the proportion of about 0.001 to 25 weight percent of organic agent based upon the weight of the mixture, and more preferably between about 0.005 and about 10 weight percent. Erosion and corrosion of the metal parts exposed to a gas-containing drilling fluid can be substantially reduced by introducing into the drilling fluid from about 0.001 to 1 gallon of the above-described additive mixture in carrier fluid per barrel of aqueous solution to be gasified. This is equivalent to adding from 0.05 to 1.0 pound of organic agent per barrel of aqueous solution to be gasified.

In order to control the penetration of the formation by the gas-containing drilling fluid, lignite is added to the drilling fluid as a fluid loss control additive as described in U.S. patent application Ser. No. 639,652 by Fischer et al. filed Dec. 11, 1975. Lignite is a class IV coal as set forth in American Standards for Testing Materials (ASTM) Specification of Coals by Rank, D-388-38. Lignite is defined as a variety of coal intermediate between peat and bituminous coal, especially one in which the texture of the original wood is distinct. It is also called "brown coal" or "wood coal". The chemical characteristics and composition of lignite have been widely described in the literature, such as in the Journal of the American Chemical Society, vol. 69 (1947), and in the U.S. Bureau of Mines Information Circular 7691, parts 1 and 2, published July, 1954. In general, the term "lignite" is used herein to mean not only lignite per se, but also all naturally occurring carboniferous materials containing 10 percent or more, preferably 30 to 50 percent, of humic acid. Lignite is used in pulverized, finely particulate form. All of the lignite should pass through a 10 mesh sieve, U.S. Standard sieve series. At least 50 percent of the lignite should preferably pass through a 200 mesh sieve. Lignite is used in an amount of from about 2 to about 10 pounds per barrel aqueous solution to be gasified.

In order to increase both the viscosity and the cuttings-carrying ability of the gas-containing drilling fluid, there is added thereto an alkali metal or ammonium salt of a polymer of acrylic acid, referred to as ammonium and alkali metal polyacrylates as described in U.S. patent application Ser. No. 639,652 by Fischer et al. filed Dec. 11, 1975. Such polymers and their use in clay-containing liquid aqueous drilling mud is further described in U.S. Pat. No. 2,552,775 issued May 15, 1951 to Fischer and Cook. The polymers have an average molecular weight which is in excess of about 2,000 and which is low enough so that their ammonium and/or alkali metal salts are dispersible in aqueous media. In general, it is desirable to use those polymers whose average molecular weight is in the range of 5,000 to 50,000 and preferably in the range of 15,000 to 35,000. The salt of the polymer may be that of any alkali metal such as sodium, potassium and/or lithium, with the sodium salts being preferred.

Polymers of acrylic acid which are useful in this invention are readily prepared from the monomer by the action of heat, light, and/or catalysts. Catalysts which are particularly effective for this polymerization are the organic peroxides, such as benzoyl peroxide and cumene hydroperoxide. The properties and nature of the polymer can be varied over a considerable range by the proper choice of catalysts and/or reaction conditions. The polymer can be further modified by the addition of small amounts of copolymerization agents such as acrylonitrile, methyl acrylate, ethyl acrylate, 2-methyl propanoic acid and the like. These copolymers of acrylic acid containing up to about 10 percent by weight of the copolymerization agent are useful and operable in the application of this invention.

A particular polymer of acrylic acid which is suitable for use in this invention is prepared for example by polymerizing acrylic acid dissolved in water to form a 10 percent by weight solution of acrylic acid at a temperature of about 50° to 100° C. and using as a catalyst about 0.5 percent by weight of benzoyl peroxide based on the amount of acrylic acid present. The polymerization is controlled to give a polymer whose average molecular weight is about 25,000. The reaction is stopped by the neutralization of the reaction mixture with sodium hydroxide after which the sodium polyacrylate is isolated. Potassium, lithium and ammonium polyacrylates are prepared by neutralizing the reaction product with the appropriate hydroxides and these salts are also useful as protecting agents in this invention. Salts of polyacrylates of other molecular weights within the above range are prepared by varying the time, temperature or pressure of the polymerization reaction, the catalyst, or the concentration of the acrylic acid or catalyst, an increase in any of these variables in general tending to increase the average molecular weight of the polymer. Other modes of polymerization, employing no water, or organic solvents, or mixtures of organic solvents and water may also be employed. These are well known in the art. The polymers are used in an amount of from about 0.5 to about 2.5 pounds per barrel of aqueous solution to be gasified and/or foamed.

To further reduce the corrosion of the metal well equipment exposed to the combination of the liquid phase of the circulating drilling fluid and the fluids produced from the formation, an alkali metal hydroxide is added to the drilling fluid in an amount sufficient to raise the pH of the return stream of drilling fluid and produced fluids circulated out of the well during the drilling operation to at least about 9. Either sodium hydroxide or potassium hydroxide can be used. The amount of alkali metal hydroxide necessary to raise the pH of the return stream to a value of at least 9 varies widely depending upon the composition of the drilling fluid, the nature of the strata being drilled and the fluids contained therein, at least a portion of which are produced and form a part of the return stream. Generally from about 0.1 to about 2 pounds per barrel of alkali metal hydroxide has been found to provide the requisite pH control.

To further reduce the corrosion of the metal well equipment exposed to the combination of the vapor phase of the circulating drilling fluid and the fluids produced from the formation, a water-soluble nitrogen-containing compound such as ammonia or a primary aliphatic monoamine having from 1 to 5 carbon atoms per molecule which is volatile at about the boiling point of water or below is added to the drilling fluid. Generally from about 1.0 to about 0.05 pound per barrel of the volatile water-soluble nitrogen-containing compound is sufficient to provide corrosion protection. The type of vapor phase corrosion of concern most often occurs on the exterior of the drill string near the top of the well. The exterior of the drill string is cooled by the relatively low temperature drilling fluid being circulated down the interior of the drill string. Thus, as the return stream of drilling fluid and produced fluids is circulated out of the well, the vaporous components thereof tend to condense on the exterior of the relatively cool drill string and create a highly corrosive environment. The temperature of the exterior of the drill string at this location is approximately that of boiling water. This temperature is too low for volatilization of ammonia or a vaporous amine from the organic agent that releases ammonia or a vaporous amine at downhole temperature and pressure. Thus, an additional corrosion inhibitor is required.

In utilizing foam drilling fluid, the gas, foaming agent and other additives may be dispersed in the aqueous phase at the surface prior to injection into the well and agitated to form a foam. However, it is generally preferred to inject the gas, foaming agent and other additives into the stream of water or brine being circulated into the well being drilled so as to form the foam as the fluids pass down the well. In utilizing aerated drilling fluid, the gas and other additives are injected into the stream of water or brine being circulated into the well.

The invention is further described by the following example which is illustrative of a specific mode of practicing the invention and is not intended as limiting the scope of the invention defined by the appended claims.

EXAMPLES 1 to 5

A series of wells are drilled into strata containing geothermal fluids at a depth of about 4,000 feet to about 9,000 feet, having a temperature of about 600° F. and a pressure of about 3,000 p.s.i. The upper portion of each well, from the surface down to a depth of about 2,000 to 4,000 feet is drilled using liquid aqueous base drilling fluid. Drilling is then continued using gas-containing drilling fluid A wherein there is circulated down the drill string, around the drill bit and back out of the well: 1,000 cubic feet per minute air; 0.133 gallon per minute erosion and corrosion inhibitor formed by mixing 75 weight percent water, 10 weight percent diethylene triamine and 15 weight percent of an acidic triester prepared by condensation of triethanolamine and dimerized linoleic acid and then diluting with additional water in the proportion of about 30 gallons inhibitor to each 10 barrels of water; 0.133 gallon per minute ammonia; 150 gallons per minute of an aqueous solution of water containing 0.01 pound per gallon sodium hydroxide; 3 pounds per barrel lignite; and 1 pound per barrel of the sodiun salt of an acrylic acid polymer having an average molecular weight of around 25,000. In an initial test there is used instead gas-containing drilling fluid B which is the same as drilling fluid A except it contains neither sodium hydroxide nor ammonia.

Corrosion inside the N-80 steel drill pipe exposed mostly to the liquid phase is monitored using an N-80 ring having an inside diameter of 2 inches, an outside diameter of 3 inches and a thickness of ⅛ inch. The ring is fitted into an expansion joint slot where two sections of 4 inch inside diameter drill pipe are coupled together near the bottom of the drill string.

Corrosion outside the N-80 steel drill pipe exposed mostly to the vapor phase is monitored using a rectangular N-80 steel coupon measuring 2 inches by 1 inch by ⅛ inch. This coupon is bolted into a slot cut in the exterior of a section of drill pipe positioned near the surface.

In each instance, the corrosion rate is calculated by determining the weight loss per unit area of the ring or coupon as a function of the time the ring or coupon was exposed to circulating gas-containing drilling fluid. The results of these tests are shown in the following Table. Example 1, using gas-containing drilling fluid B which contains neither sodium hydroxide nor ammonia, shows a much higher corrosion rate than Examples 2 through 5 using gas-containing drilling fluid A which contains both sodium hydroxide and ammonia.

TABLE

| | | | Corrosion Rate (pounds per square foot per year) | | |
|---|---|---|---|---|---|
| Ex. No. | Well Number | Drilling Fluid | Inside of Drill Pipe | Outside of Drill Pipe | Average - Inside and Outside of Drill Pipe |
| 1 | 13 | B | 3.3 | 8.9 | 6.1 |
| 2 | 13 | A | 2.7 | 0.4 | 1.5 |
| 3 | 14 | A | — | — | 1.5 |
| 4 | 15 | A | — | — | 0.98 |
| 5 | 16 | A | — | — | 0.39 |

While particular embodiments of the invention have been described, it will be understood, of course, that the invention is not limited thereto since many modifications can be made and it is intended to include within the invention such modifications as are within the scope of the claims.

The invention having thus been described, we claim:

1. A gas-containing clay free aqueous drilling fluid comprising about 99.5 to about 90 volume percent of a gas and about 0.5 to about 10 volume percent of an aqueous dispersion containing about 327 to about 347 pounds per barrel water, about 10 to about 2 pounds per barrel lignite, about 2.5 to about 5.0 pounds per barrel alkali metal or ammonium salt of a high molecular weight acrylic acid homopolymer or a copolymer of acrylic acid with up to 10 percent by weight of a monomer selected from the group consisting of acrylonitrile, methyl acrylate, ethyl acrylate and 2-methyl propanoic acid, said homopolymers and copolymers having an average molecular weight of 5,000 to 50,000, about 1.0 to about 0.05 pound per barrel of a polyamine salt having the formula:

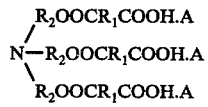

wherein $R_1$ is a bivalent hydrocarbyl radical containing about 8 to about 44 carbon atoms, $R_2$ is an alkylene radical containing about 1 to about 4 carbon atoms, and A is a water-soluble amine or ammonia, an amount of an alkali metal hydroxide sufficient to raise the pH of the return stream of drilling fluid and produced fluids circulated out of the well during drilling operations to at least about 9, and about 1.0 to about 0.05 pound per barrel of ammonia.

2. The composition defined in claim 1 wherein the aqueous dispersion also contains about 10 to about 0.25 pounds per barrel of a foaming agent.

3. The composition defined in claim 2 wherein the foaming agent is an anionic, cationic or nonionic surface active agent.

4. The composition defined in claim 1 wherein the gas is air.

5. The composition defined in claim 1 wherein the aqueous dispersion contains about 0.1 to about 2 pounds per barrel of an alkali metal hydroxide.

6. The composition defined in claim 1 wherein the alkali metal hydroxide is sodium hydroxide.

7. A gas-containing clay free aqueous drilling fluid for drilling a well into strata containing a high temperature aqueous fluid comprising about 99.5 to about 90 volume percent of a gas and about 0.5 to about 10 volume percent of an aqueous dispersion containing about 327 to about 347 pounds per barrel water, about 10 to about 2 pounds per barrel lignite, about 2.5 to about 0.5 pounds per barrel sodium salt of a high molecular weight acrylic acid homopolymer or a copolymer of acrylic acid with up to 10 percent by weight of a monomer selected from the group consisting of acrylonitrile, methyl acrylate, ethyl acrylate and 2-methyl propanoic acid, said homopolymers and copolymers having an average molecular weight of from 5,000 to 50,000, about 1.0 to about 0.05 pound per barrel of a polyamine salt having the formula:

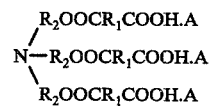

wherein $R_1$ is a bivalent hydrocarbyl radical containing about 8 to about 44 carbon atoms, $R_2$ is an alkylene radical containing about 1 to about 4 carbon atoms, and A is a water-soluble amine or ammonia, an amount of an alkali metal hydroxide sufficient to raise the pH of the return stream of drilling fluid and produced fluids circulated out of the well during drilling operations to at least about 9, and about 1.0 to about 0.05 pound per barrel of ammonia.

8. The composition defined in claim 7 wherein the aqueous dispersion also contains about 10 to about 0.25 pounds per barrel of a foaming agent.

9. The composition defined in claim 7 wherein the aqueous dispersion contains about 0.1 to about 2 pounds per barrel of an alkali metal hydroxide.

10. In the method of drilling a well into strata containing a high temperature aqueous fluid wherein a drilling fluid is passed through the well in contact with the subterranean formation during the drilling operation, the improvement which comprises employing as the drilling fluid a clay free composition comprising about 99.5 to about 90 volume percent of a gas and about 0.05 to about 10 volume percent of an aqueous dispersion containing about 327 to about 347 pounds per barrel water, about 10 to about 2 pounds per barrel lignite, about 2.5 to about 0.5 pounds per barrel alkali metal or ammonium salt of a high molecular weight acrylic acid homopolymer or a copolymer of acrylic acid with up to 10 percent by weight of a monomer selected from the group consisting of acrylonitrile, methyl acrylate, ethyl acrylate and 2-methyl propanoic acid, said homopolymers and copolymers having an average molecular weight of 5,000 to 50,000, about 1.0 to about 0.05 pound per barrel of a polyamine salt having the formula:

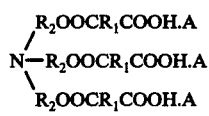

wherein $R_1$ is a bivalent hydrocarbyl radical containing about 8 to about 44 carbon atoms, $R_2$ is an alkylene radical containing about 1 to about 4 carbon atoms, and A is a water-soluble amine or ammonia, an amount of an alkali metal hydroxide sufficient to raise the pH of the return stream of drilling fluid and produced fluids circulated out of the well during drilling operations to at least about 9, and about 1.0 to about 0.05 pound per barrel of ammonia.

11. The method defined in claim 10 wherein the aqueous dispersion also contains about 10 to about 0.25 pounds per barrel of a foaming agent.

12. The method defined in claim 11 wherein the foaming agent is an anionic, cationic or nonionic surface active agent.

13. The method defined in claim 10 wherein the gas is air.

14. The method defined in claim 12 wherein the aqueous dispersion contains about 0.1 to about 2 pounds per barrel of an alkali metal hydroxide.

15. The method defined in claim 10 wherein the alkali metal hydroxide is sodium hydroxide.

16. A method of drilling a well into a high temperature subterranean formation containing a geothermal fluid comprising separately and simultaneously injecting into the well as a drilling fluid about 99.5 to about 90 volume percent of a gas and from about 0.5 to about 10 volume percent of an clay free aqueous dispersion containing about 327 to about 347 pounds per barrel water, about 10 to about 2 pounds per barrel lignite, about 2.5 to about 0.5 pounds per barrel sodium salt of a high molecular weight acrylic acid homopolymer or a copolymer of acrylic acid with up to 10 percent by weight of a monomer selected from the group consisting of acrylonitrile, methyl acrylate, ethyl acrylate and 2-methyl propanoic acid, said homopolymers and copolymers having an average molecular weight of from 5,000 to 50,000, about 1.0 to about 0.05 pound per barrel of a polyamine salt having the formula:

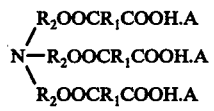

wherein $R_1$ is a bivalent hydrocarbyl radical containing about 8 to about 44 carbon atoms, $R_2$ is an alkylene radical containing about 1 to about 4 carbon atoms, and A is a water-soluble amine or ammonia, an amount of an alkali metal hydroxide sufficient to raise the pH of the return stream of drilling fluid and produced fluids circulated out of the well during drilling operations to at least about 9, and about 1.0 to about 0.05 pound per barrel of ammonia.

* * * * *

UNITED STATES PATENT OFFICE
CERTIFICATE OF CORRECTION

Patent No. 4,092,252                    Dated May 30, 1978

Inventor(s) Paul W. Fischer and David S. Pye

It is certified that error appears in the above-identified patent and that said Letters Patent are hereby corrected as shown below:

Claim 1, line 44, the number 5.0 should be 0.5

*Signed and Sealed this*

*Thirty-first* Day of *October 1978*

[SEAL]

Attest:

RUTH C. MASON
*Attesting Officer*

DONALD W. BANNER
*Commissioner of Patents and Trademarks*